(12) United States Patent
Wolf et al.

(10) Patent No.: US 7,427,092 B2
(45) Date of Patent: Sep. 23, 2008

(54) HYDRAULIC SYNCHRONIZATION OF SLIDE-OUT FOR RECREATIONAL VEHICLE

(75) Inventors: Andrew James Wolf, Bremen, IN (US); John D. Franzini, Brookfield, WI (US)

(73) Assignee: Actuant Corporation, Butler, WI (US)

( * ) Notice: Subject to any disclaimer, the term of this patent is extended or adjusted under 35 U.S.C. 154(b) by 53 days.

(21) Appl. No.: 11/626,699

(22) Filed: Jan. 24, 2007

(65) Prior Publication Data

US 2007/0194587 A1 Aug. 23, 2007

Related U.S. Application Data

(63) Continuation-in-part of application No. 11/360,369, filed on Feb. 23, 2006, now Pat. No. 7,258,389.

(60) Provisional application No. 60/658,679, filed on Mar. 4, 2005.

(51) Int. Cl.
*B60P 3/34* (2006.01)

(52) U.S. Cl. .................. 296/26.13; 296/26.01

(58) Field of Classification Search ............. 296/26.13, 296/171, 175, 165, 26.05, 26.01
See application file for complete search history.

(56) References Cited

U.S. PATENT DOCUMENTS

| | | | | |
|---|---|---|---|---|
| 3,797,880 A | * | 3/1974 | Pezzaglia | 296/26.13 |
| 4,561,824 A | * | 12/1985 | Okabe et al. | 414/697 |
| 5,758,918 A | * | 6/1998 | Schneider et al. | 296/26.13 |
| 5,833,296 A | * | 11/1998 | Schneider | 296/26.13 |
| 5,915,774 A | * | 6/1999 | Tiedge | 296/26.13 |
| 6,164,069 A | * | 12/2000 | Takahashi et al. | 60/421 |
| 6,318,742 B2 | | 11/2001 | Franzini | |
| 6,345,854 B1 | * | 2/2002 | McManus | 296/26.13 |
| 6,471,275 B1 | * | 10/2002 | Kunz et al. | 296/26.01 |
| 6,536,823 B2 | * | 3/2003 | McManus | 296/26.13 |
| 6,575,514 B2 | * | 6/2003 | McManus et al. | 296/26.01 |
| 6,619,713 B2 | * | 9/2003 | Eichhorn | 296/26.01 |
| 6,637,794 B2 | * | 10/2003 | McManus et al. | 296/26.01 |
| 6,655,723 B2 | * | 12/2003 | Meijer et al. | 296/26.01 |
| 6,696,813 B2 | * | 2/2004 | McManus et al. | 318/700 |
| 2004/0256874 A1 | * | 12/2004 | Rex | 296/26.13 |
| 2005/0179277 A1 | * | 8/2005 | Schneider | 296/26.01 |
| 2005/0179278 A1 | * | 8/2005 | Yoder | 296/26.13 |
| 2007/0063525 A1 | * | 3/2007 | Howells | 296/24.3 |

* cited by examiner

*Primary Examiner*—Kiran B. Patel
(74) *Attorney, Agent, or Firm*—Quarles & Brady LLP (57) ABSTRACT

A hydraulic synchronization system for a slide-out portion of a recreational vehicle has at least two cylinders spaced apart and reversed in orientation with respect to one another. The bore sides of the cylinders are connected and the rod sides of the cylinders are connected such that hydraulic fluid is pumped from the rod side of one cylinder to the rod side of the other cylinder and from the bore side of one cylinder to the bore side of the other cylinder upon extension and retraction of the slide-out portion to keep the slide-out portion synchronized.

6 Claims, 7 Drawing Sheets

HYDRAULIC SYNCHRONIZATION OF SLIDE-OUT FOR RECREATIONAL VEHICLE

CROSS-REFERENCE TO RELATED APPLICATION

This application is a continuation-in-part of U.S. patent application Ser. No. 11/360,369, filed Feb. 23, 2006, now U.S. Pat. No. 7,258,389 and entitled "Hydraulic Synchronization of Slide-Out for Recreational Vehicle"; and U.S. Provisional Patent Application Ser. No. 60/658,679, filed Mar. 4, 2005 and entitled "Hydraulic Synchronization of Slide-Out for Recreational Vehicle".

STATEMENT CONCERNING FEDERALLY SPONSORED RESEARCH OR DEVELOPMENT

Not applicable.

FIELD OF THE INVENTION

This invention relates to expandable vehicles, and particularly to synchronization of the movement of a slide-out room of a recreational vehicle.

Slide-out operating mechanisms for moving rooms in and out in recreational vehicles are well known. Such a mechanism may have two telescopic rails spaced apart that are powered in and out to move the room in and out, out to expand the living space of the recreational vehicle, and in to contract it for over-the-road travel. Other mechanisms also exist that have cables, or the room is directly driven in and out. In any case, the movement of the two sides of the room must be synchronized to one another, or else the room will become canted, possibly resulting in damage to the vehicle. In a rack and pinion system, synchronization is accomplished by pinions at opposite ends of a shaft meshing with racks on two rails or on the room. In such mechanisms, any of a number of means may be used to power the rails in and out, including an electric motor that drives the pinions, a hydraulic cylinder, a lead screw, cables or linkage mechanisms.

The present invention provides an alternative for synchronizing the movement of a slide-out room.

SUMMARY OF THE INVENTION

Synchronization of the movement of a slide-out room is accomplished using a plurality of hydraulic actuators. A pair of master actuators may be arranged so as to retract when the room is extended and a pair of slave actuators may be arranged so as to extend when the room is extended. The bore side of the cylinder of each of the master actuators is connected through a hydraulic line to the bore side of the cylinder of one of the slave actuators. Likewise, the rod side of the cylinder of each of the master actuators is connected through a hydraulic line to the rod side of the cylinder of the corresponding slave actuator. As such, the bore sides exchange fluid with one another and the rod sides exchange fluid with one another, but the bore sides do not exchange fluid with the rod sides. Thus, extension of one cylinder causes an equal and opposite retraction of the other cylinder, and vice versa. Accordingly, both sides of the slide-out move in and out in synchronization with one another. A driving actuator provides a driving force to extend the room and thereby actuate the interlinked master and slave actuators. This system could be applied to the top and bottom of the room as well, to synchronize the top and bottom movement rather than or in addition to the side-to-side movement.

Preferably the master actuators are situated close to the driving actuator. In accordance with one embodiment, a synchronization system for a recreational vehicle slide-out having a fixed portion and a slide-out portion that is movable relative to the fixed portion is disclosed. The system includes a plurality of rails having a fixed portion coupled to the fixed portion of the recreational vehicle and a movable portion coupled to the slide-out portion of the recreational vehicle. The system also includes at least one master actuator coupled to a first of the plurality of rails and having a chamber configured to contract as the slide-out portion of the recreational vehicle is extended away from the fixed portion of the recreational vehicle. At least one slave actuator is coupled to a second of the plurality of rails and includes a chamber configured to expand as the slide-out portion of the recreational vehicle is extended away from the fixed portion of the recreational vehicle. A flow path connects the chamber of the at least one master actuator with the chamber of the at least one slave actuator to thereby substantially synchronize movement of the plurality of rails as the movable portion is adjusted with respect to the fixed portion.

In accordance with another embodiment, a synchronization system for a recreational vehicle slide-out having a fixed portion and a slide-out portion that is movable relative to the fixed portion is disclosed. The system includes a plurality of rails having a fixed portion coupled to the fixed portion of the recreational vehicle and a movable portion coupled to the slide-out portion of the recreational vehicle. The system also includes a driving actuator coupled to at least one of the plurality of rails to cause a position of the movable portion of the at least one rail to adjust with respect to the fixed portion of the at least one rail to adjust a position of the slide-out portion of the recreational vehicle with respect to the fixed portion of the recreational vehicle. At least one master actuator is coupled to at least one of the plurality of rails and includes a chamber filled with hydraulic fluid and configured to contract as the slide-out portion of the recreational vehicle is extended away from the fixed portion of the recreational vehicle by the driving actuator and expand as the slide-out portion of the recreational vehicle is retracted toward the fixed portion of the recreational vehicle by the driving actuator. Additionally, the system includes at least one slave actuator coupled to at least one of the plurality of rails and having a chamber filled with hydraulic fluid and configured to expand as the slide-out portion of the recreational vehicle is extended away from the fixed portion of the recreational vehicle and contract as the slide-out portion of the recreational vehicle is retracted toward the fixed portion of the recreational vehicle by the driving actuator. At least one closed flow path connects the chamber of the at least one master actuator and the chamber of the at least one slave actuator to reciprocally share hydraulic fluid therebetween to substantially synchronize movement of the at least one rail coupled to the at least one slave actuator with movement of the at least one rail coupled to the driving actuator.

In accordance with still another embodiment, a synchronization system for a recreational vehicle slide-out having a fixed portion and a slide-out portion that is movable relative to the fixed portion is disclosed. The system includes a plurality of rails having a fixed portion coupled to the fixed portion of the recreational vehicle and a movable portion coupled to the slide-out portion of the recreational vehicle. The system also includes a driving actuator coupled to at least one of the plurality of rails to cause a position of the movable portion of the at least one rail to adjust with respect to the fixed portion of the at least one rail. At least one master actuator is coupled to the at least one of the plurality of rails coupled to the driving actuator and includes at least one chamber filled with hydraulic fluid and configured to contract as the slide-out portion of the recreational vehicle is extended away from the fixed portion of the recreational vehicle by the driving actuator and expand as the slide-out portion of the recreational vehicle is retracted toward the fixed portion of the recreational vehicle by the driving actuator. At least one slave actuator is coupled to at least one of the plurality of rails and includes at least one chamber filled with hydraulic fluid and configured to expand as the slide-out portion of the recreational vehicle is extended away from the fixed portion of the recreational vehicle and contract as the slide-out portion of the recreational vehicle is retracted toward the fixed portion of the recreational vehicle by the driving actuator. Additionally, the system includes at least one closed flow path connecting the at least one chamber of the at least one master actuator, and the at least one chamber of the at least one slave actuator to reciprocally share hydraulic fluid therebetween to substantially synchronize movement of the at least one of the plurality of rails coupled to the at least one slave actuator with movement of the at least one of the plurality of rails coupled to the driving actuator.

Various other features of the present invention will be made apparent from the following detailed description and the drawings.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Referring now to FIGS. 1-4, a system described in U.S. Pat. No. 5,758,918 is shown, the description of which is incorporated herein by reference. In particular, FIGS. 1-3 of the current application correspond to FIGS. 1-3 of U.S. Pat. No. 5,758,918, and FIG. 4 of the current application corresponds to FIG. 14 of U.S. Pat. No. 5,758,918.

Figure 1:
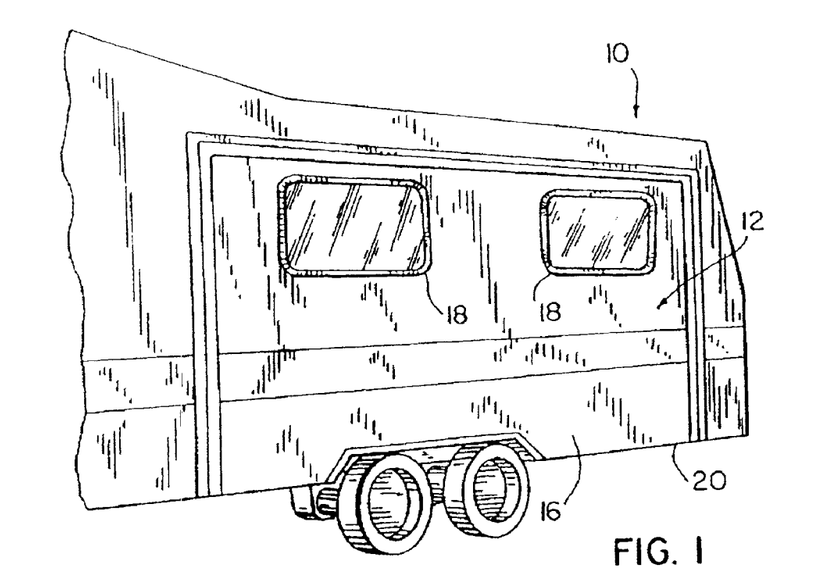
FIG. 1 is a perspective view of a slide-out room of a trailer in a retracted position.
Figure 2:
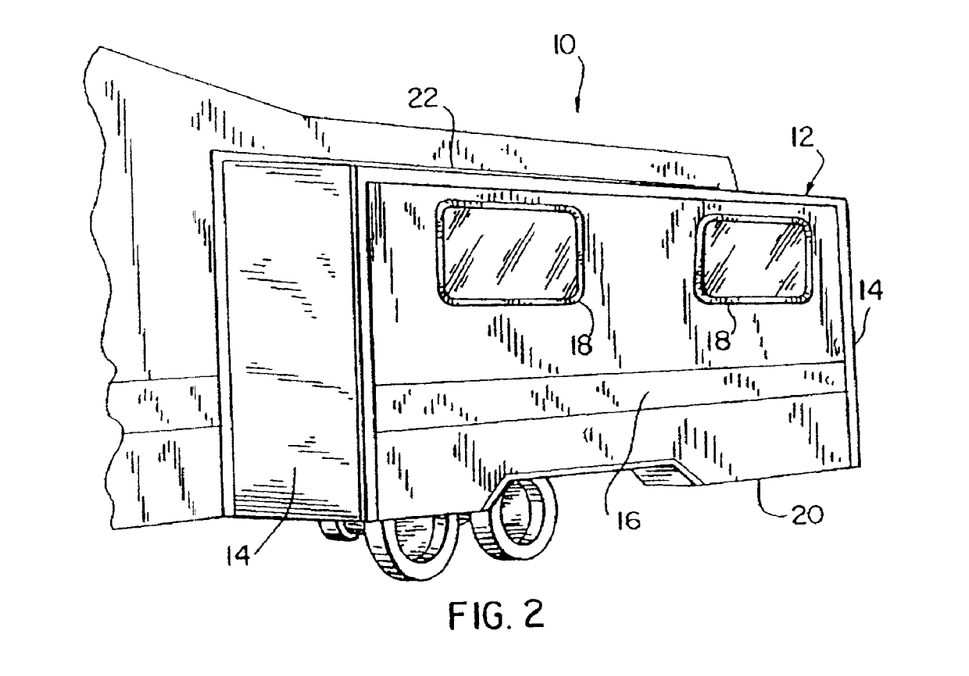
FIG. 2 is a view like FIG. 1 of the slide-out in an extended position.

Referring now to FIG. 1, a side perspective view of a vehicle body 10 having mounted thereon an expandable, telescopic slide-out section 12 is shown in a fully retracted position. On the other hand, FIG. 2 shows a view similar to that of FIG. 1 with the slide-out section 12 fully extended. The slide-out section 12 is rectangularly configured and includes a pair of side walls 14, a front wall 16 with two windows 18, a bottom wall 20, and a roof 22. An arrangement for supporting and controlling the slide-out section 12 is adapted to be mounted beneath the vehicle body 10, as will be described below.

Referring now to FIGS. 1-4, an operating mechanism 24 for selectively extending and retracting the slide-out section 12 of the vehicle body 10 includes a pair of substantially parallel, hollow outer rail members 26. As is generally known, each outer rail member 26 has a closed upper wall, closed side walls, and an open bottom wall. Additionally, each of the outer rail members 26 is supported by a pair of structural frame members 34, 36 that form part of the frame of vehicle 10 and that extend along the sides of the vehicle body 10. That is, each outer rail member 26 is secured at its ends 38 to one of the structural frame members 34, 36. The structural frame member 34 on the side of the vehicle body 10 having the slide-out section 12 includes apertures that allow the outer rail members 26 to pass through the structural frame members 34 where they are welded in place. Slidably carried for longitudinal movement in the fixed, outer rail members 26 is a pair of substantially parallel, hollow, movable rail members 42 for supporting the slide-out section 12 thereon. Each of the movable, inner rail members 42 has a closed upper wall, closed sidewalls, and a closed bottom wall.

The movable rail members 42 are carried in the fixed rail members 26 by way of an upper roller arrangement rotatably mounted at the movable end 52 of each inner rail member 42, and a lower roller arrangement rotatably mounted on a U-shaped bracket 58 welded to the outer one of a pair of plates 59. The plates 59 are welded to the outer end of each fixed rail member 26. While the bracket 58 is shown and described as being U-shaped, it is understood that bracket 58 may be any other satisfactory shape, as desired. The plates 59 are located one on either side of the vehicle frame to the transverse member 34 of the vehicle body 10 and engage the side walls of the frame member 34. The upper roller arrangement is comprised of a large roller 60 centrally disposed in the inner rail member 42. The large roller 60 projects through an opening at the end of upper wall of each inner rail member 42 and into continuous rolling engagement with the underside of the upper wall of the outer rail member 26. The lower roller arrangement is comprised of a pair of large rollers 70 supported by the U-shaped bracket 58. Each of the large rollers 70 rides in continuous rolling engagement with the bottom wall of the movable rail member 42. Thus, the upper and lower roller arrangements provide vertical support for slide-out section 12 when retracted and at the same time permit smooth, low friction in-and-out telescopic movement of slide-out section 12 relative to the vehicle body 10.

In particular, along the closed bottom of the movable rail members 42 are a downwardly projecting gear track 50 welded for engagement with an associated gear (not shown). In addition, each of the movable rail members 42 has an inner end 52 confined within one of the fixed rail members 26 and an outer end 54 adapted for attachment by bracket and fastener means 56 to the slide-out section 12. Accordingly, two pinion gears (not shown) are connected by the shaft 84. The two pinion gears rotate together because they are connected by the shaft 84, and therefore the two rails 42 are synchronized in their extension and retraction motions.

Figure 3:
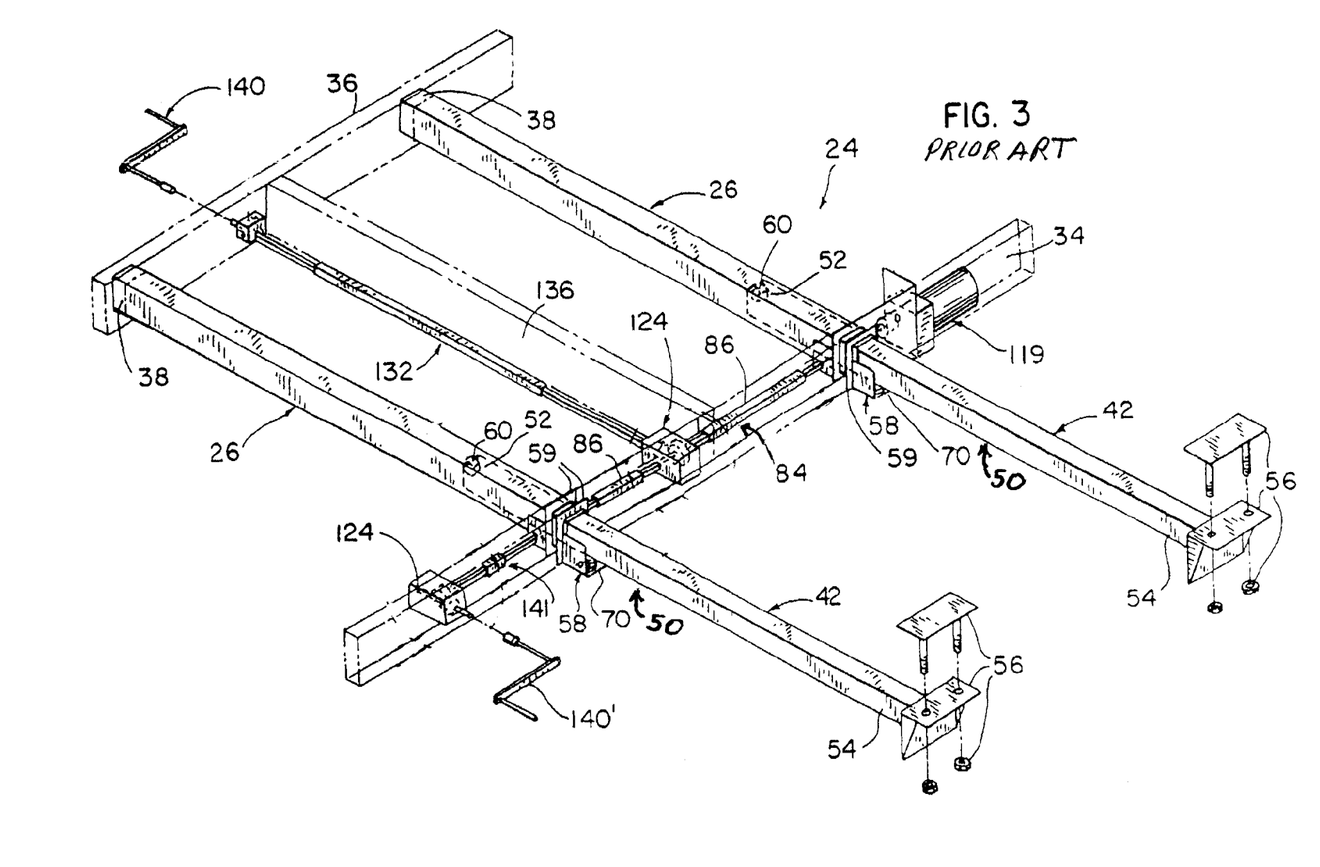
FIG. 3 is a perspective view of a prior art slide-out operating mechanism for the slide-out of FIGS. 1 and 2.

The operating mechanism 24 preferably relies upon an automatic, powered arrangement providing selected extension or retraction of the expandable section 12. Referring primarily to FIG. 3, a drive shaft assembly 84 includes a series of tubular drive shaft elements 86 having square cross sections telescopically interconnected with drive shaft sections. The drive shaft assembly 84 is supported for rotation parallel to the structural member 34. This configuration is particularly advantageous in accommodating various spans between the movable rail members 42 and the fixed rail members 26, depending on the construction of the vehicle to which operating mechanism 24 is being mounted.

In the embodiment of FIG. 3, an electric-motor-brake 119 drives the two pinion gears to move the movable rails members 42 in and out. The integral electric motor-brake 119 is especially attractive in providing more precise, controlled, smooth movement of the slide-out section 12 with positive stopping and locking. The square-sectioned design of the movable and fixed rail members 42, 26, and the roller bearing arrangement provided on the ends thereof ensures a low friction, sturdy design which does not demand large amounts of power. The operating mechanism 24 enables the inclusion of the manual override 124, which may be strategically positioned based on the constitution of the vehicle embodying the slide-out section 12. The telescopic crankshaft 132 and drive shaft 84 may be configured to accommodate various widths of the vehicle. In addition or alternatively, manual drive handles 140 may also be provided.

As an alternative to any of the above-mentioned powered or manual motive arrangements, the operating system of the invention could also be driven simply by extending the drive shaft 84, mechanism as by lengthening extension 141, to extend to a location where it is accessible from the front or rear of the vehicle. The operator can then engage the drive shaft extension end with a wrench or other satisfactory tool, and rotate the wrench or tool to rotate the drive shaft. This provides an extremely simple, inexpensive slide-out operating mechanism by eliminating the powered motive device and the override gear boxes.

Figure 4:
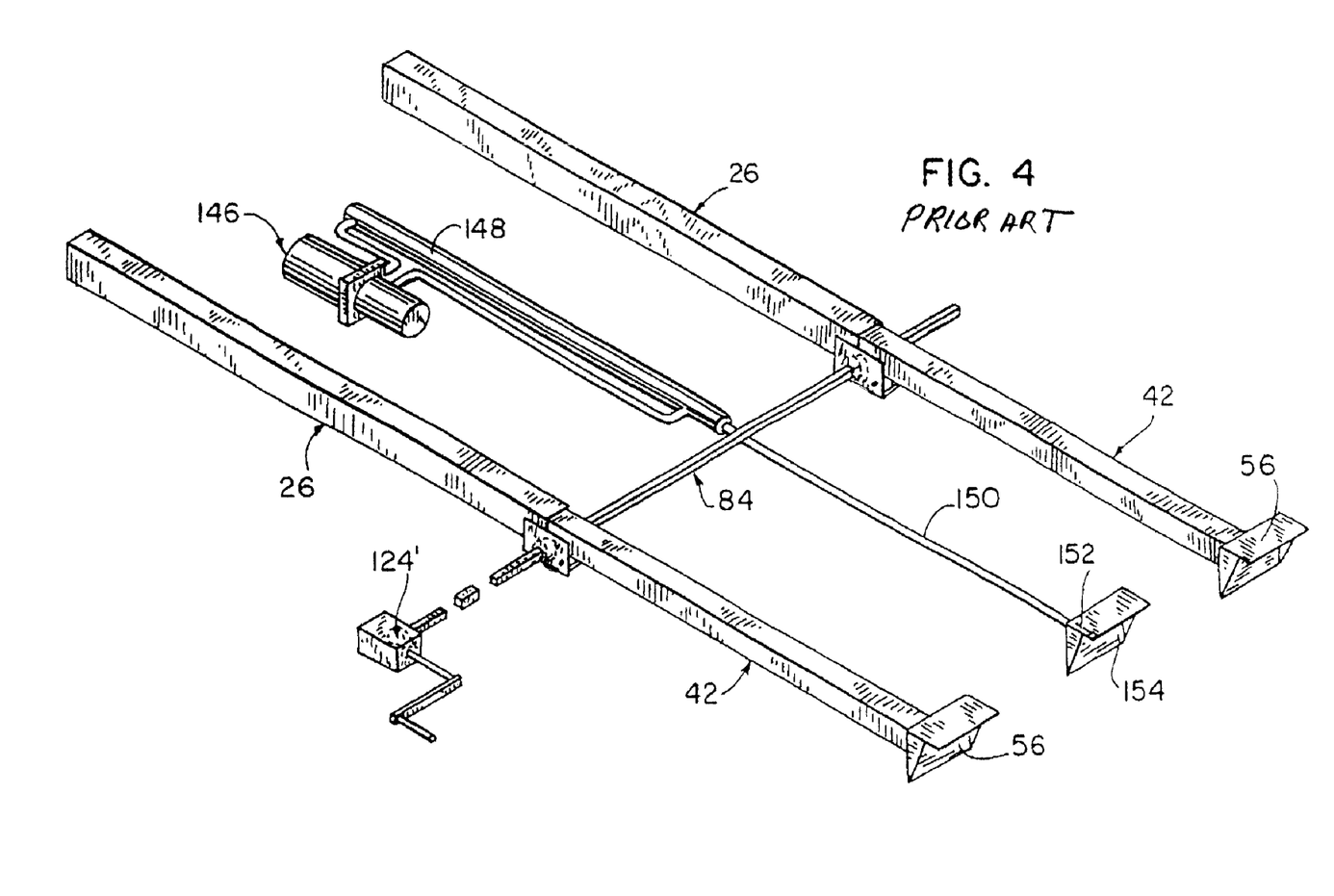
FIG. 4 is a hydraulically powered variation of the slide-out mechanism of FIG. 3, that is also prior art.

Referring now to FIG. 4, the operating mechanisms may employ one or more hydraulic motive arrangements to selectively extend and retract slide-out section 12. In the embodiment of FIG. 4, a hydraulic cylinder 148 and pump 146 are used to extend and retract a slide-out room. In this case, the racks connected to the rails and the pinions connected to one another by the shaft 84 synchronize the movement of the rails 42. In this arrangement, at least one hydraulic motor 146 is used to provide a source of power for one or more hydraulic cylinders 148, each having an extendable rod 150 that is attachable to the slide-out section 12. The hydraulic cylinder 148 may be used to power the primary slide-out section or an additional slide-out section (not shown) on the vehicle. The hydraulic motor 146 and cylinder 148 can either be mounted on one of the outer rail members 26 or on a reinforcing beam, such as shown at 136 in FIG. 3.

As illustrated in FIG. 3, the rod end 152 may be directly attached to one of brackets 56 so that extension and retraction of the cylinder 148 will be converted into synchronous movement of both inner rail members 42 and outer rail members 26 due to the interconnections of drive shaft 84 and gear tracks 50. Alternatively, in the system of FIG. 4, the rod end 152 of the cylinder 148 is attached to an optional separate bracket and fastener 154 located between bracket and fastener 56. Again, linear motion of the rod 150 will be translated directly into linear back-and-forth motion of the slide-out section 12, which results in synchronous in-and-out movement of movable rail members 42 relative to fixed rail members 26 by means of the aforementioned drive shaft, spur gear, and gear track interconnections.

The present invention provides a hydraulic solution to the synchronization of the rails 42 and eliminates the above-described, mechanical synchronizing mechanisms such as the racks, pinions, and the connecting shafts.

Figure 5:
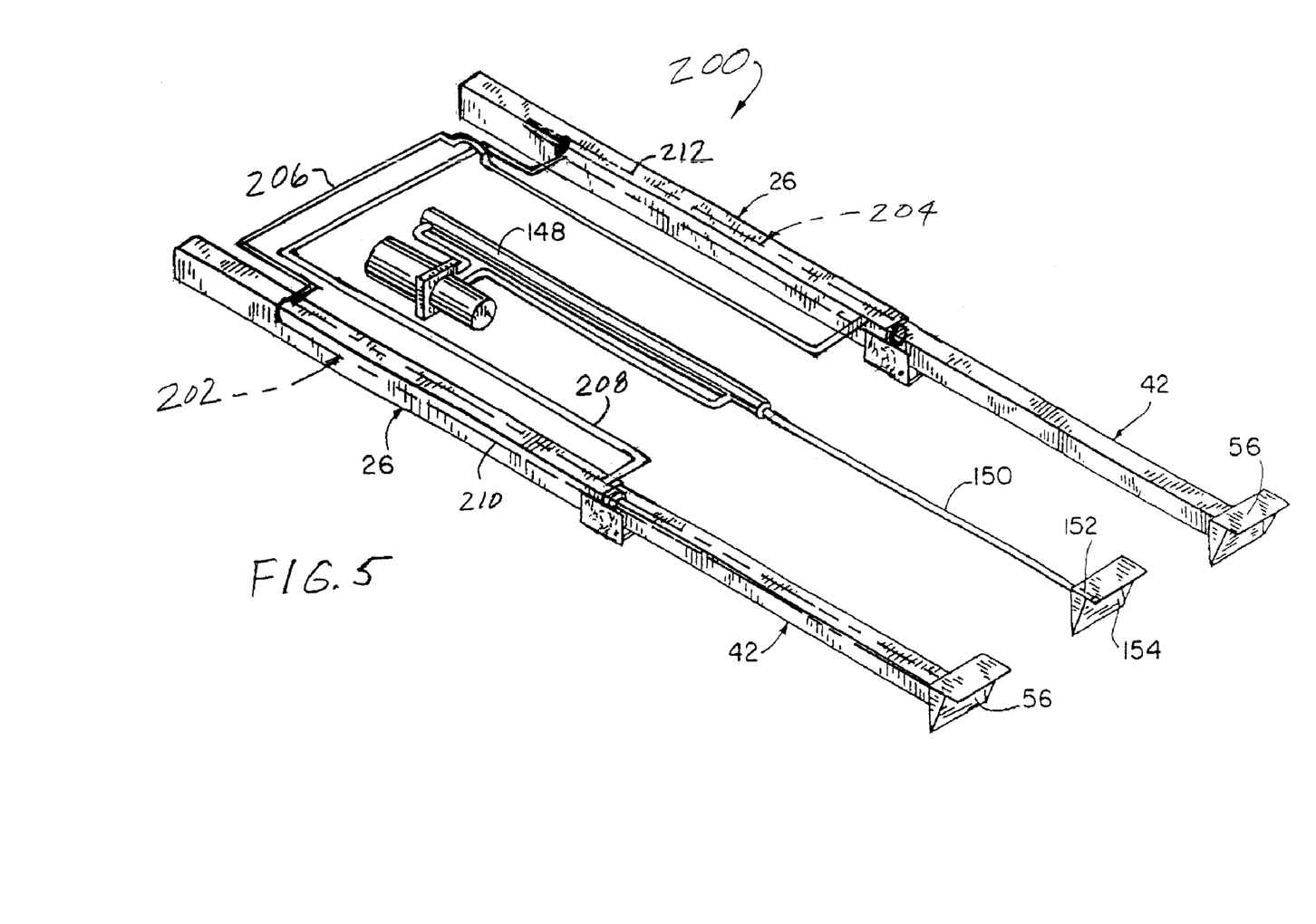
FIG. 5 is a hydraulic slide-out synchronization system of the present invention.
Figure 6:
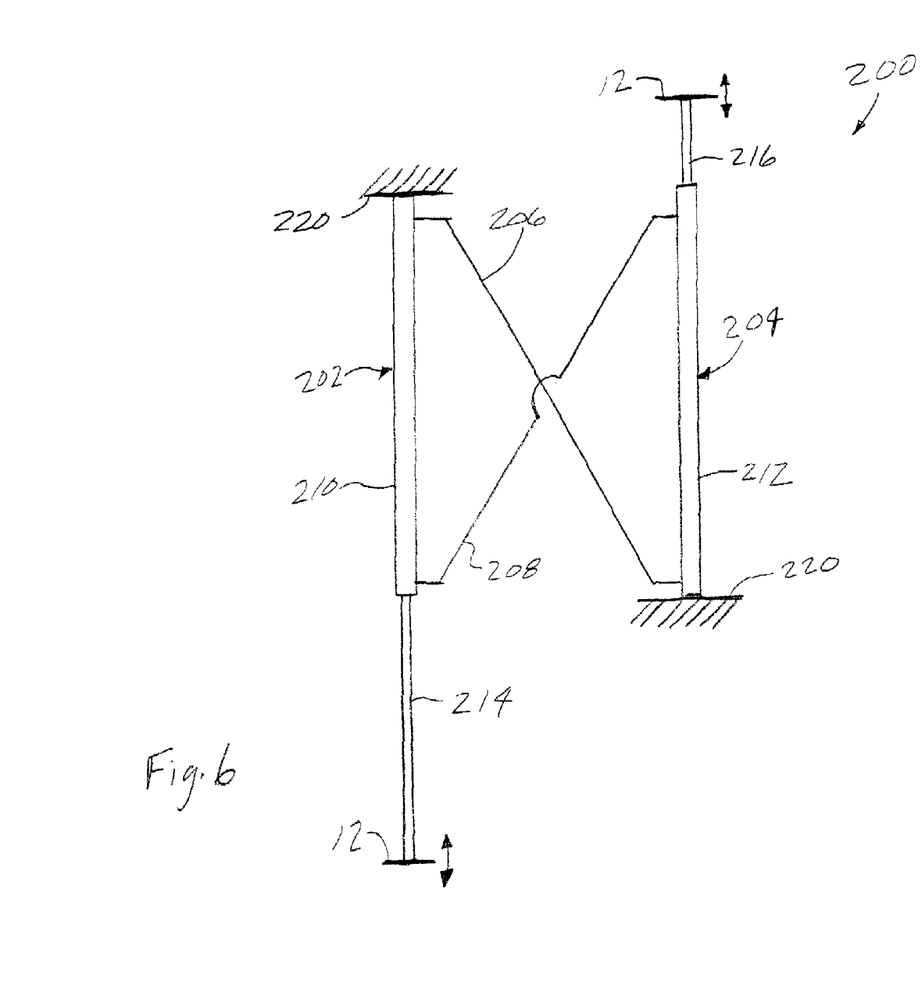
FIG. 6 is a schematic view of the hydraulic synchronization system of FIG. 5.

Referring to FIGS. 5 and 6, a hydraulic synchronization system 200 of the present invention includes a pair of hydraulic actuators 202, 204. Each actuator 202, 204 includes a cylinder 210, 212, respectively, and a rod, or piston rod 214, 216, respectively. The bore end (or other part) of the cylinder 210 is fixed to a stationary frame 220, such as a frame of the RV or a fixed rail, analogous to item 26, 34 or 36 in FIG. 3, or any other fixed member of the RV. That is, the bore end (or other part) of actuator 202, 204 is fixed to the stationary frame 220 of the RVs, and/or the fixed rail 26. The rods 214, 216, on the other hand, are secured to the slide-out or movable rail 42.

A first hydraulic line 206 connects the bore sides of the hydraulic actuators 202, 204, and a second hydraulic line 208 connects the rod sides of the hydraulic actuators 202, 204. As illustrated in FIG. 5, the hydraulic actuators 202, 204 may be incorporated inside of the hollow tubes that make up the rails 42 and 26. However, that need not be the case.

As is clear from FIGS. 5 and 6, the directional mounting of the actuators 202, 204 is reversed, such that extension of the room causes extension of one of the cylinders and retraction of the other. Likewise, retraction of the room causes retraction of the one cylinder and extension of the other. Thus, fluid is pumped back and forth between the rod side chambers of the cylinders 210, 212 and the bore side chambers of the cylinders 210, 212 as the room extends and retracts, which keeps the two sides of the room synchronized. This is because the cylinders 210, 212 are the same size, and the bore sides of both actuators 202, 204 are in closed fluid communication with one another, and the rod sides of both cylinders are in closed fluid communication with one another.

Thereby, a system of the invention is completely passive, not requiring any power input to keep the two sides of the rooms synchronized as the room is moved in and out. However, power input is required to move the room, and that may be accomplished by a gear drive, a hydraulic cylinder as in FIG. 5, a screw driven mechanism, cables, a manually driven mechanism, or any other type of mechanism for moving the room in and out.

Figure 7:
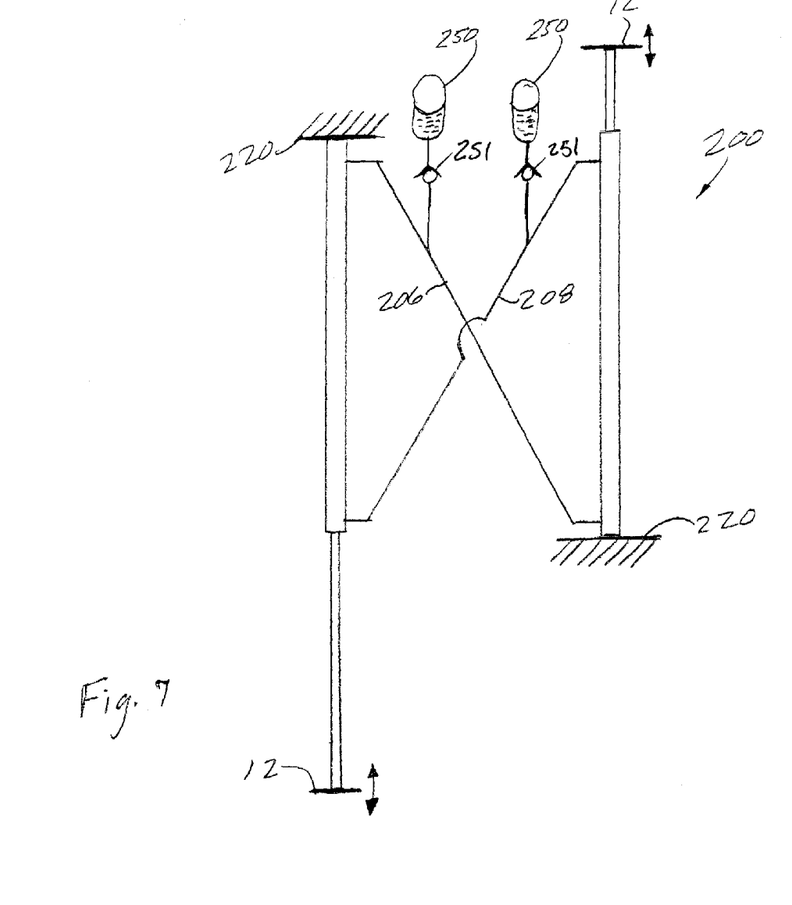
FIG. 7 is a view like FIG. 6 of a variation.

Referring now to FIG. 7, the embodiment of FIG. 6 can be modified to keep both hydraulic circuits full of hydraulic fluid at all times. In this modification, an accumulator 250 having a pressurized fluid chamber is in communication with each of the circuits 206 or 208 through a one way check valve 251, which only permits fluid to flow from the accumulator 250 to the respective circuit 206 or 208. Thereby, if fluid leaks out of either of the circuits 206, 208, it will be replenished by the accumulators 250, and reverse flow from the circuits 206, 208 to the accumulators 250 is prevented by the check valve 251.

Many modifications and variations to the embodiments described above are contemplated. For example, with respect to the system described with respect to FIG. 6, the rods 214, 216 of the actuator 202, 204 could be stationary (i.e., fixed to RV frame or stationary rail 26) and the bore end of the actuators 202, 204 could be attached to the movable rail 42. This configuration would result in the cylinders 210, 212 and hydraulic lines 206, 208 moving with the movable rail 42. This may be somewhat undesirable, but possibly tolerable in some applications.

Figure 8:
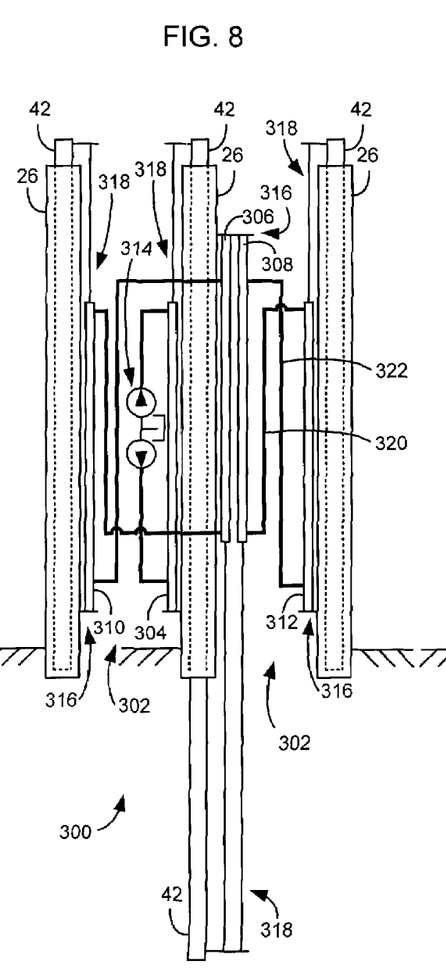
FIG. 8 is a schematic view of another hydraulic synchronization system of the present invention shown in a retracted position.
Figure 9:
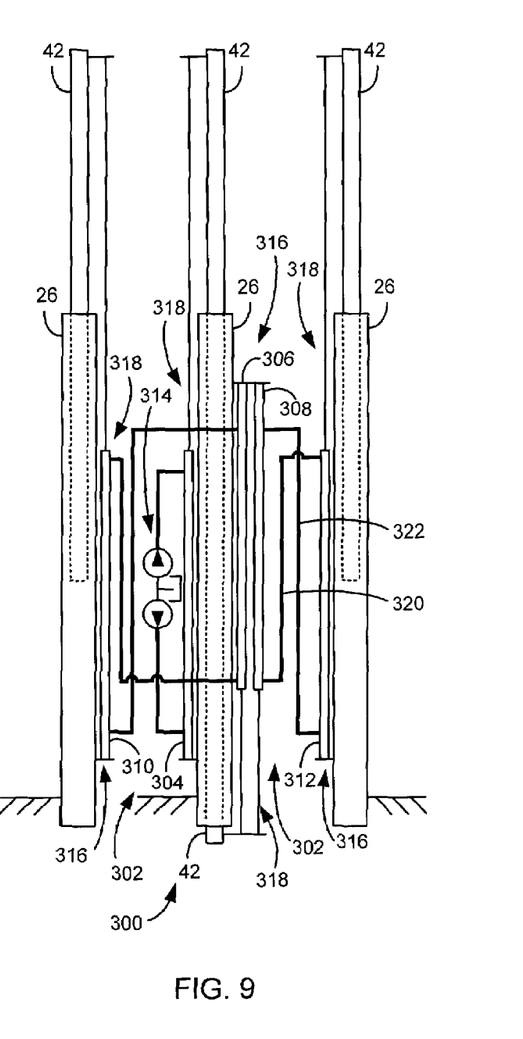
FIG. 9 is a schematic view of the hydraulic synchronization system of FIG. 8 shown in an extended position.

Referring now to FIGS. 8 and 9, another configuration 300 is shown for hydraulically synchronizing extension and retraction of a room, as described above. In particular, FIG. 8 shows hydraulic components 302 and associated rails 26, 42 when the room is in the retracted position and FIG. 9 shows the hydraulic components 302 and the associated rails 26, 42 when the room is in the extended position.

The hydraulic components include a driving actuator 304, a pair of master actuators 306, 308, and a pair of slave actuators 310, 312. In addition, a pump 314 is coupled with the driving actuator 304 that, as will be described, controls extension and contraction of the system. Each actuator 304-312 includes a rod 316 that extends from a bore 318. The bore end of each actuator 304-312 is coupled to a stationary rail member 26 and each rod is coupled to a respective movable rail member 42.

In a manner similar to the system described with respect to FIGS. 5-7, the directional mounting of the master actuators 306, 308 is reversed with respect to the slave actuators 310, 312, as well as the driving actuator 304. Furthermore, the bore end 316 of each master actuator 306, 308 is coupled through a closed flow path 320 to a respective bore end 316 of the slave actuators 310, 312. Likewise, the rod end 318 of each master actuator 306, 308 is coupled through another closed flow path 322 to a respective rod end 318 of the slave actuators 310, 312. Accordingly, extension of one set of actuators, for example, the master actuators 306, 308 shown in FIG. 8, causes corresponding retraction of the other set of actuators, in this case, the slave actuators 310, 312, and vice versa. That is, fluid is pumped back and forth between the rod side chambers of each set of master and slave actuators and the bore side chambers of each set of master and slave actuators. Therefore, as described above, the process of extension and retraction is synchronized.

In operation, the driving actuator 304 is driven by the pump 314 to extend or retract. Since the driving actuator 304 is coupled to the same rail members 26, 42 as the master actuators 306, 308, the master actuators 306, 308 are caused to move into an inverse position of the driving actuator 304. For example, if the driving actuator 304 is extended, the master actuators 306, 308 are pushed into the retracted position shown in FIG. 9 by the shared movable rail member 42. On the other hand, if the driving actuator 304 is retracted into the position shown in FIG. 8, the master actuators 306, 308 are pulled by the shared movable rail member 42 into the extended position also shown in FIG. 8. Since, as described above, the bore end 316 of each master actuator 306, 308 is coupled to a respective bore end 316 of the slave actuators 310, 312, and the rod end 318 of each master actuator 306, 308 is coupled to a respective rod end 318 of the slave actuators 310, 312, as the driving actuator 304 expands and contracts (causing reciprocal motion by the master actuators 306, 308), the slave actuators 310, 312 are moved in synchronous motion with the driving actuator 304.

It is contemplated that the rail and actuator assembly 300 can be adjusted in small amounts to compensate for slight variations in the system. For example, slight adjustments can be made to the amount of fluid held by the hydraulic system 302. In this regard, a manufacturer or service technician can carefully calibrate the overall system 300 to be synchronized.

The above-described system is completely passive, in that it needs no power to keep the sides in synchronization with one another. In addition, any means may be used to power the slide-out in and out, including manual power with it just being pushed in and out by a human or cranked in and out if the manual input is a crank or other means. Alternatively, an electric drive could be used using a rack and pinion arrangement or a lead screw, a cable system, a chain system, or a different type of mechanical link system could be used to drive the system. Additionally, a hydraulically driven system could be used, such as a single cylinder mounted between the two synchronization cylinders or elsewhere. Since the hydraulic synchronizing cylinders are separate from the drive systems and passive, they will always work to keep the two sides of the slide-out in synchronization with one another regardless of the type of drive that is used or where it is applied to the room.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A synchronization system for a recreational vehicle slide-out having a fixed portion and a slide-out portion that is movable relative to the fixed portion, the system comprising:
   a plurality of rails having a fixed portion coupled to the fixed portion of the recreational vehicle and a movable portion coupled to the slide-out portion of the recreational vehicle;
   at least one master actuator coupled to a first of the plurality of rails and having a chamber configured to contract as the slide-out portion of the recreational vehicle is extended away from the fixed portion of the recreational vehicle;
   at least one slave actuator coupled to a second of the plurality of rails and having a chamber configured to expand as the slide-out portion of the recreational vehicle is extended away from the fixed portion of the recreational vehicle; and
   a flow path connecting the chamber of the at least one master actuator with the chamber of the at least one slave actuator to thereby substantially synchronize movement of the plurality of rails as the movable portion is adjusted with respect to the fixed portion.

2. The system of claim 1 wherein the at least one master actuator includes another chamber configured to expand as the movable portion of the recreational vehicle is extended away from the fixed portion of the recreational vehicle and the at least one slave actuator includes another chamber configured to contract as the movable portion of the recreational vehicle is extended away from the fixed portion of the recreational vehicle and further comprising another flow path connecting the another chamber of the at least one master actuator with the another chamber of the at least one slave actuator to thereby substantially synchronize movement of the plurality of rails as the movable portion is adjusted with respect to the fixed portion.

3. The system of claim 1 further comprising a driving actuator coupled to at least one of the plurality of rails to selectively adjust a position of the movable portions of the plurality of rails with respect to the fixed portions of the plurality of rails and thereby adjust a position of the slide-out portion of the recreational vehicle with respect to the fixed portion of the recreational vehicle.

4. The system of claim 3 wherein the driving actuator and the at least one master actuator each include a rod and a bore, and wherein the bores of the driving actuator and the at least one master actuator are coupled to the fixed portion of a common rail, and wherein the rods are coupled to opposite ends of the movable portion of the common rail.

5. The system of claim 3 further comprising a pump configured to drive the driving actuator.

6. The system of claim 1 wherein the flow path creates a closed hydraulic coupling between the at least one master actuator and the at least one slave actuator.

* * * * *